United States Patent [19]
Ando et al.

[11] Patent Number: 5,509,730
[45] Date of Patent: Apr. 23, 1996

[54] BRAKE FLUID PRESSURE CONTROL APPARATUS

[75] Inventors: Hiromi Ando; Kenji Sano; Yoshihiko Kobayashi, all of Yamanashi, Japan

[73] Assignee: Tokico Ltd., Kanagawa, Japan

[21] Appl. No.: 390,477

[22] Filed: Feb. 17, 1995

[30] Foreign Application Priority Data

Feb. 18, 1994 [JP] Japan ................................. 6-021533

[51] Int. Cl.⁶ ................................................. B60T 8/32
[52] U.S. Cl. ................................ 303/117.1; 303/116.2; 303/119.1; 303/901
[58] Field of Search .......................... 303/117.1, 119.1, 303/119.2, 116.1, 116.4, 115.1, 115.5, 113.2, 115.4, DIG. 1, DIG. 2, 901, 900, 84.1, 84.2, 116.2

[56] References Cited

U.S. PATENT DOCUMENTS

| | | | |
|---|---|---|---|
| 5,290,098 | 3/1994 | Burgdorf et al. | 303/117.1 |
| 5,335,982 | 8/1994 | Ando et al. | 303/117.1 |
| 5,397,175 | 3/1995 | Matsunaga et al. | 303/117.1 |
| 5,403,078 | 4/1995 | Farr | 303/113.2 |

FOREIGN PATENT DOCUMENTS

| | | | |
|---|---|---|---|
| 545338 | 6/1993 | European Pat. Off. | 303/117.1 |
| 5-178176 | 7/1993 | Japan | 303/116.1 |
| 6-645133 | 3/1994 | Japan | 303/117.1 |
| 6-179359 | 6/1994 | Japan | 303/115.4 |
| 2262580 | 6/1993 | United Kingdom | 303/116.1 |

*Primary Examiner*—Douglas C. Butler
*Attorney, Agent, or Firm*—Wenderoth, Lind & Ponack

[57] ABSTRACT

A brake fluid pressure control apparatus includes a second pump communicating port disposed to face a first pump communicating port approximately perpendicularly to the direction of movement of a spool. The first and second pump communicating ports are connected to a master cylinder, and a check valve is provided between the master cylinder and the first and second pump communicating ports. The check valve is adapted to open when the master cylinder-side brake fluid pressure becomes a predetermined value higher than the pump discharge-side brake fluid pressure. A master cylinder communicating port is provided to extend along the direction of movement of the spool. A cut-off valve is provided between the master cylinder communicating port and the master cylinder. The cut-off valve is closed when the spool is moved to provide communication between the pump communicating ports and a wheel cylinder communicating port.

4 Claims, 4 Drawing Sheets

BRAKE FLUID PRESSURE CONTROL APPARATUS

BACKGROUND OF THE INVENTION

The present invention relates to a brake fluid pressure control apparatus used for antiskid control to prevent wheellock when the brakes are applied.

One type of known brake fluid pressure control apparatus includes a flow control valve having a casing which has a port communicating with a master cylinder, a port communicating with a wheel cylinder, a port communicating with a variable-capacity reservoir through a normally-closed valve, and a port communicating with the discharge side of a pump that sucks the reservoir-side brake fluid and discharges it. The flow control valve further has a spool slidably provided in the casing to cause the conditions of each port to change between communicating and noncommunicating states.

The spool functions as follows. When it is held in a stationary state by the biasing force of a spool spring when the antiskid control is inoperative, the spool provides communication between the master cylinder communicating port and the wheel cylinder communicating port to transmit the brake fluid pressure from the master cylinder to the wheel cylinder. When the antiskid control is activated, the spool moves to a position for closing the master cylinder communicating port to cut off the communication with the wheel cylinder communicating port, and the spool is maintained in this position by the action of the brake fluid supplied from the pump communicating port.

In this known control apparatus, fluid discharged from the pump is introduced from the pump communicating port through the clearance between the casing and the spool, and is transmitted to the master cylinder through the master cylinder communicating port. Although the amount of this fluid is little, the transmitted discharge pressure may undesirably induce a stroke of the master cylinder, causing uncomfortable pedal kick back.

Further, since the master cylinder communicating port is provided to face perpendicularly to the travel direction of the spool, the master cylinder-side fluid pressure acts on the spool in a direction perpendicular to the travel direction thereof. Accordingly, even if the pump discharge pressure from the pump communicating port acts on the spool in the opposite direction, the spool is pressed against the casing wall from one side owing to the difference between these pressures, so that it becomes difficult for the spool to slide smoothly. Consequently, there may be a slight delay in the response of the antiskid control.

SUMMARY OF THE INVENTION

Accordingly, an object of the present invention is to provide a brake fluid pressure control apparatus which is capable of completely preventing the pump discharge pressure from influencing the master cylinder and of enabling the spool to slide smoothly during antiskid control, and hence enhances the response of the antiskid control.

To attain the above-described object, the present invention provides a brake fluid pressure control apparatus including a flow control valve which has a casing and a spool. The casing has a port communicating with a master cylinder, a port communicating with a wheel cylinder, a port communicating with a variable-capacity reservoir through a normally-closed valve, and a first pump communicating port communicating with the discharge side of a pump that sucks the reservoir-side brake fluid and discharges it. The spool is slidably provided in the casing so that, when it is held in a stationary state by the biasing force of a spool spring when antiskid control is inoperative, the spool provides communication between the master cylinder communicating port and the wheel cylinder communicating port, whereas, when the spool is moved and brought into a movable state against the biasing force of the spool spring by a pressure difference produced between two ends of the spool at least during a repressurizing process of the antiskid control, the spool provides communication between the first pump communicating port and the wheel cylinder communicating port. A second pump communicating port is provided in the casing so that the second pump communicating port communicates with the discharge side of the pump, and it also communicates with the wheel cylinder communicating port when the spool is in the movable state. The second pump communicating port is disposed to face the first pump communicating port approximately perpendicularly to the direction of movement of the spool. The first and second pump communicating ports are connected to the master cylinder. A check valve is provided between the first and second pump communicating ports on the one hand and the master cylinder on the other. The check valve is adapted to open when the master cylinder-side brake fluid pressure becomes a predetermined value higher than the pump discharge-side brake fluid pressure. The master cylinder communicating port is provided in the casing of the flow control valve so as to extend along the direction of movement of the spool. In addition, a cut-off valve is provided between the master cylinder communicating port and the master cylinder. The cut-off valve is closed when the spool is brought into the movable state.

DETAILED DESCRIPTION OF THE PREFERRED EMBODIMENT

Prior to the description of one embodiment of the present invention, a known brake fluid pressure control apparatus will be explained with reference to FIGS. 4 to 6 for the purpose of facilitating the understanding of the present invention.

Figure 4:
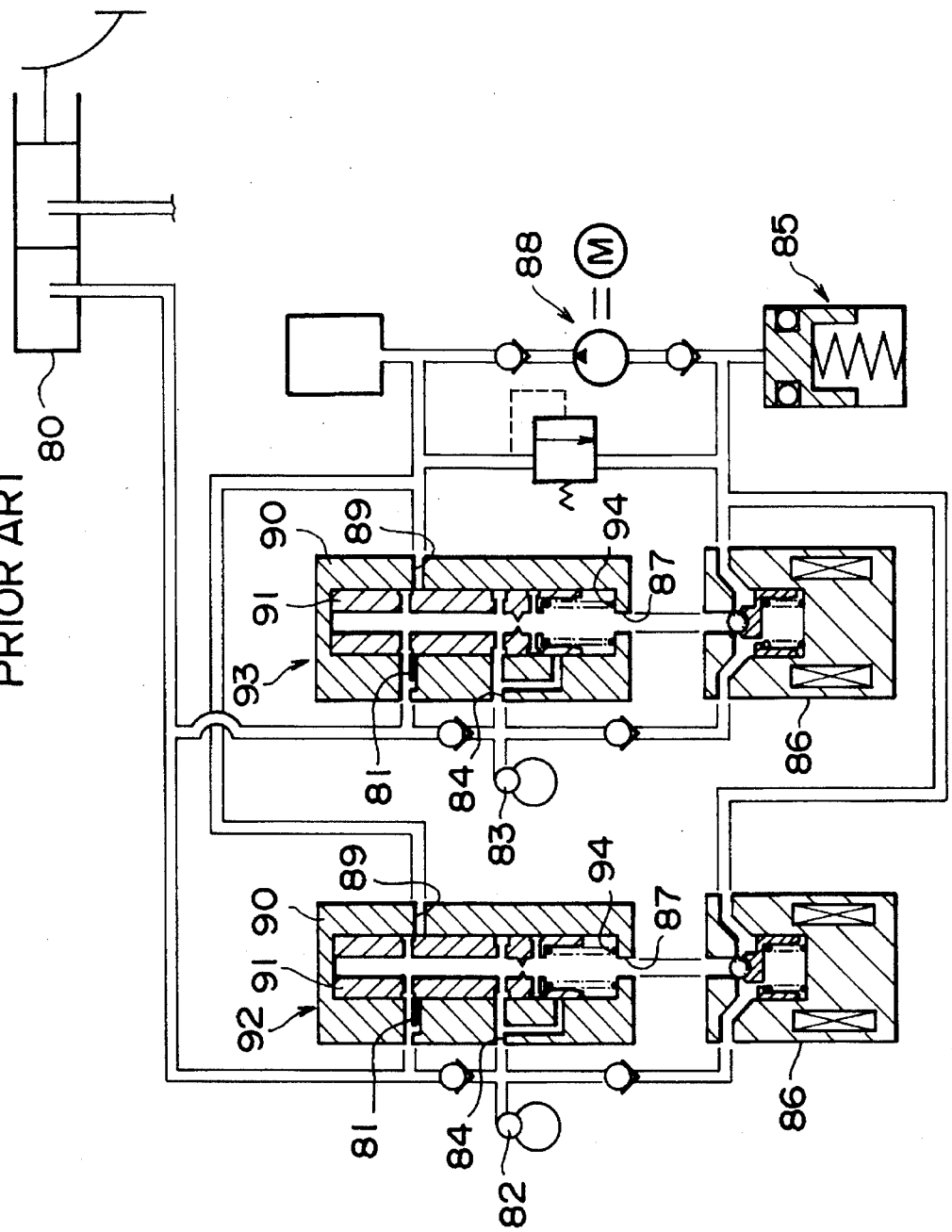
FIG. 4 is a schematic diagram of a conventional brake fluid pressure control apparatus.
Figure 5:
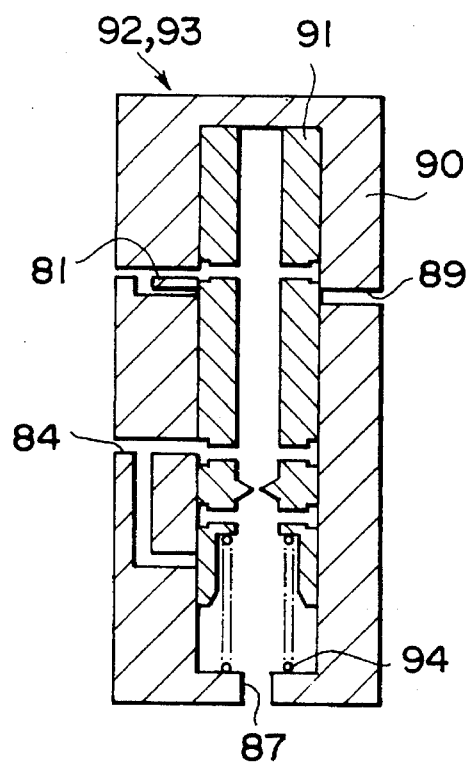
FIG. 5 is a sectional view of a flow control valve which is in a stationary state in the conventional brake fluid pressure control apparatus.

The control apparatus shown in FIG. 4 comprises flow control valves 92 and 93 each having a casing 90 and a spool 91. The casing 90 has a port 81 communicating with a master cylinder 80, a port 84 communicating with a wheel cylinder 82 (83), a port 87 communicating with a variable-capacity reservoir 85 through a normally-closed valve 86, and a port 89 communicating with the discharge side of a pump 88 that sucks the reservoir-side brake fluid and discharges it. The spool 91 is slidably provided in the casing 90 to cause the conditions of each port to change between communicating and noncommunicating states.

The spool 91 functions as follows. As shown in FIG. 5, when the spool 91 is held in a stationary state by the biasing force of a spool spring 94 when the antiskid control is inoperative, the spool 91 provides communication between the master cylinder communicating port 81 and the wheel cylinder communicating port 84 to transmit the brake fluid pressure from the master cylinder 80 to the wheel cylinder 82 (83).

Figure 6:
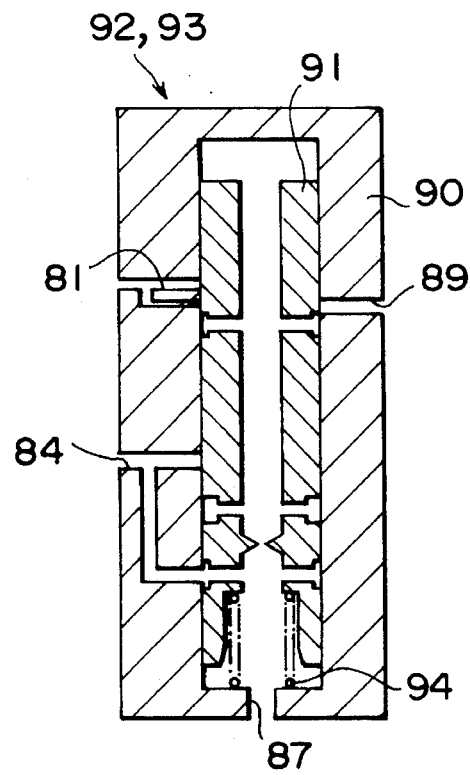
FIG. 6 is a sectional view of the flow control valve of the conventional brake fluid pressure control apparatus which is in a movable state.

As shown in FIG. 6, when the spool 91 is moved against the biasing force of the spool spring 94 by a pressure difference produced between the two ends of the spool 91 at least during repressurizing process of the antiskid control, the spool 91 substantially closes the master cylinder communicating port 81 to prevent the discharge pressure of the pump 88 from substantially influencing the brake fluid pressure on the master cylinder side, and also provides communication between the pump communicating port 89 and the wheel cylinder communicating port 84 to transmit the discharge pressure of the pump 88 to the wheel cylinder 82 (83). It should be noted that the spool 91 is balanced by the pressure difference between the two ends thereof to control the degree of opening of the pump communicating port 89 in the range including a state of being closed; in FIG. 6, a state where the opening of the port 89 is reduced to a substantial degree is shown.

Thus, the flow control valves 92 and 93 are arranged to cause the conditions of each port to change between communicating and noncommunicating states by the action of the spool 91. However, since the spool 91 is slidably provided in the casing 90, there is a slight clearance between the spool 91 and the wall of a little casing 90. Accordingly, the influence of the fluid discharged from the pump 88 flows from the pump communicating port 89 through the clearance, and is transmitted to the master cylinder 80 through the master cylinder communicating port 81. Thus, the transmitted discharge pressure may undesirably induce a stroke of the master cylinder 80, causing uncomfortable pedal kick back.

Further, the master cylinder communicating port 81 is provided to face perpendicularly to the travel direction of the spool 91, and when closed by the spool 91, the master cylinder communicating port 81 has the master cylinder-side fluid pressure introduced thereto. Therefore, the fluid pressure acts on the spool 91 onesidedly in a direction perpendicular to the travel direction thereof. Accordingly, even if the pump discharge pressure from the pump communicating port 89 acts on the spool 91 in the opposite direction, the spool 91 is pressed against the casing wall from one side owing to the difference between these pressures, so that it becomes difficult for the spool 91 to slide smoothly. Consequently, there may be a slight delay in the response of the antiskid control.

One embodiment of the brake fluid pressure control apparatus according to the present invention will be described below with reference to FIGS. 1 to 3.

It should be noted that the terms "vertical", "upper" and "lower" employed in the following description mean the vertical direction, and the upper and lower sides, respectively, as viewed in the drawings for the sake of convenience.

In the drawings, reference numeral 1 denotes a brake fluid pressure control apparatus. A tandem-type master cylinder 2 is connected to a brake pedal 3. The master cylinder 2 has two brake fluid pressure generating chambers 2A and 2B which generate a brake fluid pressure according to the degree to which the brake pedal 3 is stepped on, and which transmit the brake fluid pressure to two control systems of brake fluid pressure control circuits A and B, respectively, which have a cross-piping arrangement, for example.

Since the arrangement of the brake fluid pressure control circuit B is the same as that of the brake fluid pressure control circuit A, only the arrangement of the control circuit A is illustrated and explained below.

The brake fluid pressure control circuit A has a path 4 which connects with the brake fluid pressure generating chamber 2A in the master cylinder 2. The path 4 is divided into paths 5 and 6, which are provided with respective flow control valves 7 and 8.

The flow control valves 7 and 8 each include a casing 10 having a cylinder portion 9 extending vertically and a plurality of ports which are provided in the cylinder portion 9 to extend from the inner periphery to the outer periphery thereof.

The ports include: a first port (second pump communicating port) 11 provided at a predetermined position to extend perpendicularly to the axis of the cylinder portion 9 so as to communicate with the master cylinder 2 through the paths 4 and 5 or 6; a second port (wheel cylinder communicating port) 16 provided a predetermined distance below the first port 11 to communicate with a wheel cylinder 14 or 15, which is a brake fluid pressure actuator of, for example, a disk brake or a drum brake, through a path 12 or 13; a third port (reservoir communicating port) 17 provided in the lower end of the cylinder portion 9 to extend along the axis of the cylinder portion 9; and a fourth port (first pump communicating port) 18 provided to face the first port 11.

It should be noted that in this embodiment the fourth port 18 has the same diameter as that of the first port 11 and is coaxially disposed with the first port 11 so as to also extend perpendicularly to the travel direction of the spool 38.

The second port 16 comprises an upper port 19 which is provided a predetermined distance below and parallel to the first port 11, and a lower port 20 which is provided a predetermined distance below and parallel to the upper port 19 and which communicates at the outer end thereof with the upper port 19.

The third ports 17 of the flow control valves 7 and 8 communicate with a variable-capacity reservoir 24 through respective paths 21 and 22 and a path 23 into which the paths 21 and 22 join together. The paths 21 and 22 are provided with respective normally-closed electromagnetic valves (normally-closed valves) 25 and 26.

The path 23 is connected with a path 27, which is provided with a pump 29. The pump 29 is composed of a pump body 31 driven to perform suction and discharge by a motor 30, which is common to the two brake fluid pressure control circuits A and B, a suction valve 32 provided on the reservoir-side of the pump body 31, and a discharge valve 33 provided on the side of the pump body 31 which is remote from the suction valve 32. Thus, the pump 29 sucks the reservoir-side brake fluid and discharges it from the discharge valve 33.

The portion of the path 27 that lies on the discharge side of the pump 29 is connected to a path 35 provided between the fourth port 18 and the path 4. The fourth port 18 of the flow control valve 7 is connected to the path 6 through a path 36.

It should be noted that a noise chamber 37 for reducing the discharge pulsation of the pump 29 is provided between the path 35 and that portion of the path 27 which lies on the discharge side of the pump 29.

Figure 2:
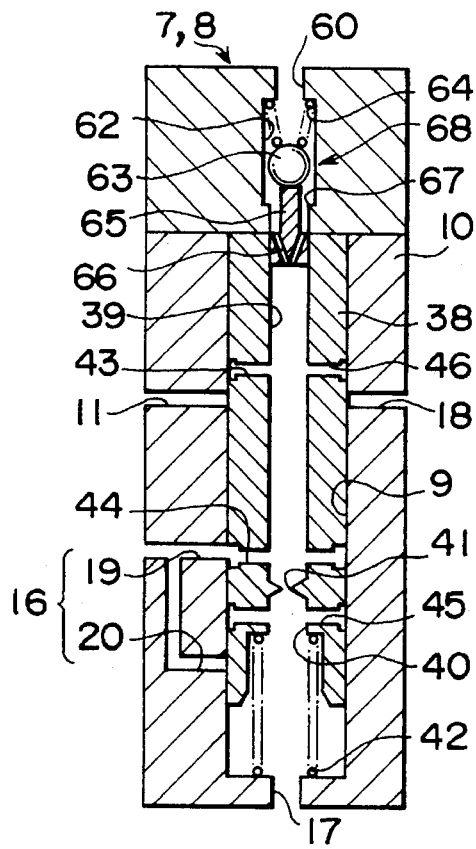
FIG. 2 is a sectional view schematically showing of a flow control valve which is in a stationary state in the brake fluid pressure control apparatus according to the present invention.
Figure 3:
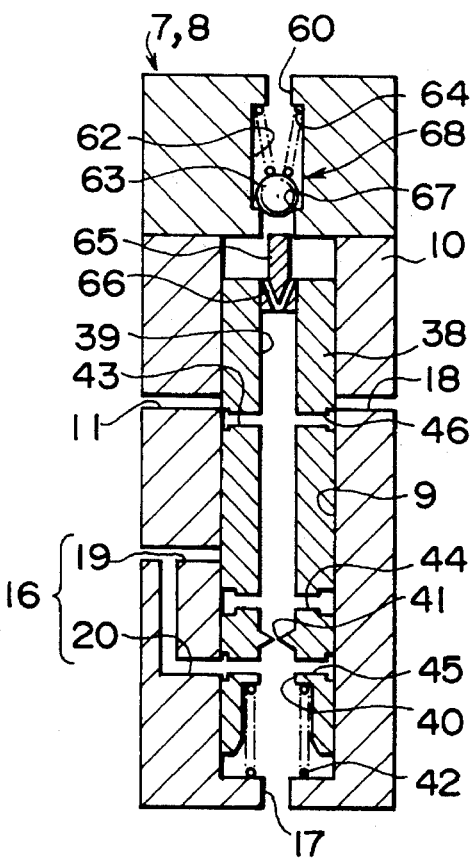
FIG. 3 is a sectional view of the flow control valve which is in a movable state.

As shown in FIGS. 2 and 3, the flow control valves 7 and 8 each have a cylindrical spool 38 vertically slidably fitted in the cylinder portion 9 of the casing 10. The spool 38 has an upper bore 39 with a predetermined diameter which is provided in the center thereof to extend axially from the upper end of the spool 38 to a predetermined intermediate position, and a lower bore 40 which extends from the lower end of the spool 38 to a predetermined intermediate position in coaxial relation to the upper bore 39 and with the same diameter as that of the upper bore 39. The lower bore 40 always communicates with the third port 17. The upper and lower bores 39 and 40 communicate with each other through a small-diameter bore 41 having a diameter which is a predetermined amount smaller than the diameters of the upper and lower bores 39 and 40.

It should be noted that the lower end portion of the lower bore 40 is enlarged to have a diameter which is a predetermined amount larger than that of the other portion of the lower bore 40, and the upper end of a spool spring 42 is inserted into the opening of the lower bore 40. The lower end of the spool spring 42 abuts on the lower end wall of the cylinder portion 9. The spool spring 42 biases the spool 38 upwardly with a predetermined force.

Further, the spool 38 is provided with a plurality of bores extending perpendicularly to the axes of the upper and lower bores 39 and 40.

The bores include a first bore 43, a second bore 44, a third bore 45, and a fourth bore 46. The first bore 43 is provided a predetermined distance below the upper end of the spool 38 so that when the spool 38 is in a stationary state (i.e., the state shown in FIG. 2) where the upper end of the spool 38, which is biased by the spool spring 42, abuts the upper end wall of the cylinder portion 9, the communication between the upper bore 39 and the first port 11 is substantially cut off, whereas, when the spool 38 is moved by a pressure difference produced between the two ends thereof when the antiskid control is activated (i.e., when the spool 38 is in the state shown in FIG. 3), the first bore 43 provides communication between the upper bore 39 and the first port 11. The second bore 44 is provided a predetermined distance below the first bore 43 so that when the spool 38 is in the above-described stationary state, the second bore 44 provides communication between the upper bore 39 and the upper port 19 of the second port 16, whereas, when the spool 38 is moved to the position shown in FIG. 3, the communication between the upper bore 39 and the upper port 19 is substantially cut off. The third bore 45 is provided a predetermined distance below the second bore 44 so that when the spool 38 is in the stationary state, the communication between the lower bore 40 and the lower port 20 of the second port 16 is substantially cut off, whereas, when the spool 38 is moved as shown in FIG. 3, the third bore 45 provides communication between the lower bore 40 and the lower port 20. The fourth bore 46 is provided opposite to the first bore 43 on the same axis so that when the spool 38 is in the stationary state, the communication between the upper bore 39 and the fourth port 18 is substantially cut off, whereas, when the spool 38 is moved to reach the position shown in FIG. 3, the fourth bore 46 provides communication between the upper bore 39 and the fourth port 18. It should be noted that, when moved, the spool 38 is balanced by the pressure difference between the two ends thereof to control the degree of opening for communication between the first port 11 and the first bore 43 and the degree of opening for communication between the fourth port 18 and the fourth bore 46 in the range including a noncommunicating state; in FIG. 3, a state where the opening is reduced to a substantial degree is shown.

Although the first and fourth bores 43 and 46 have been described as independent from each other for the sake of convenience, it should be noted that these bores are not different in properties from each other because the first and fourth bores 43 and 46 are connected by respective circumferential grooves of the same width which are provided in the outer periphery of the spool 38 about the axis of the spool 38 and, therefore it is sufficient if one of the bores 43 and 46 is provided. The second bore 44 and the third bore 45 also are connected by respective circumferential grooves provided in the outer periphery of the spool 38.

Figure 1:
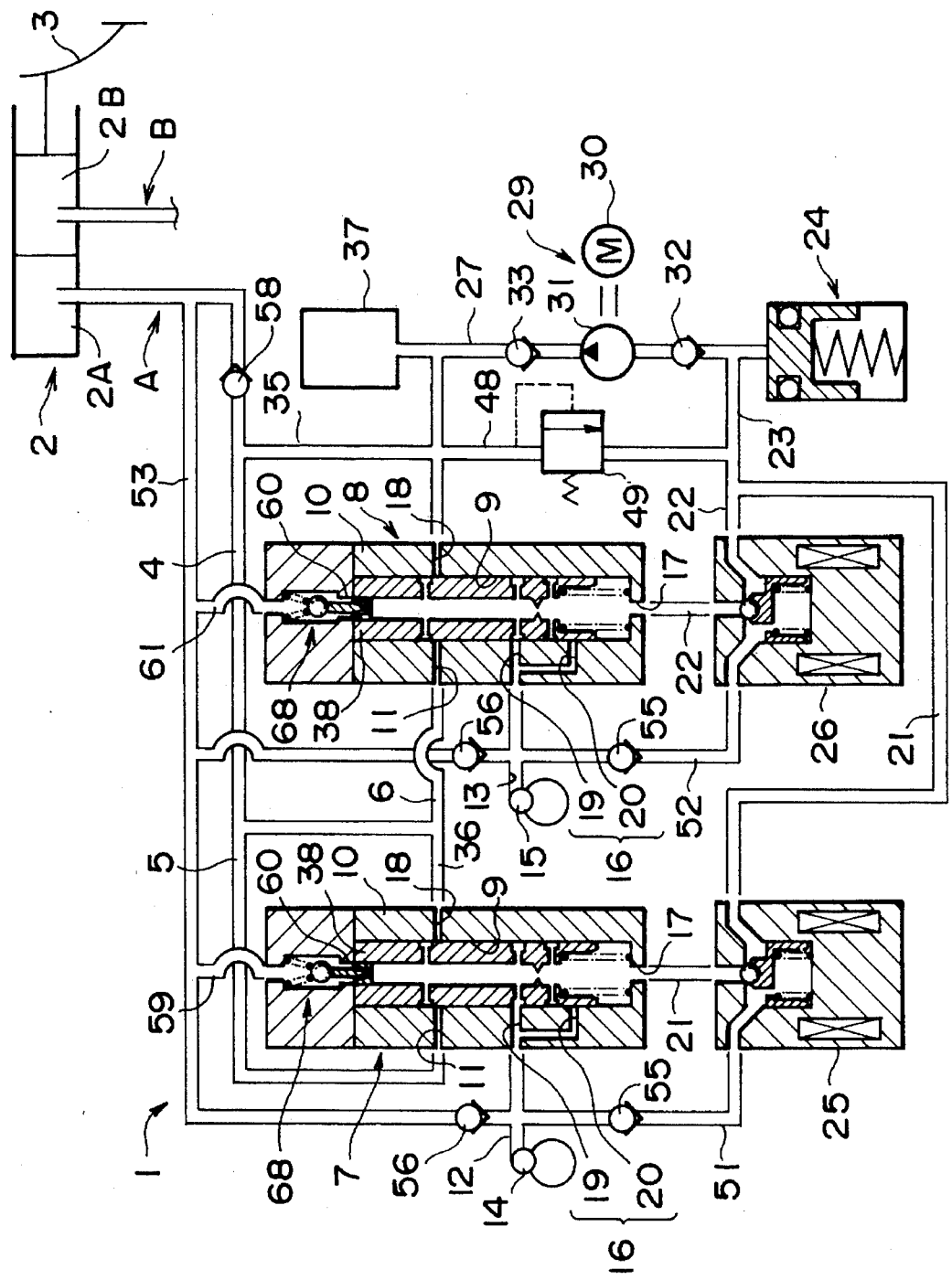
FIG. 1 is a schematic diagram of one embodiment of a brake fluid pressure control apparatus according to the present invention.

As shown in FIG. 1, the path 23 and the junction of the paths 27 and 35 are connected together by a path 48, and a relief valve 49 is provided in the path 48. The relief valve 49 monitors the brake fluid pressure in that portion of the path 48 which is connected to the discharge side of the pump 29. The relief valve 49 opens when the brake fluid pressure at the monitor position reaches a predetermined level.

The relief valve 49 is adapted to open when the discharge pressure of the pump 29 becomes higher than is needed, thereby allowing the excess discharge pressure of the pump 29 to escape to the suction side of the pump 29, and thus preventing the discharge pressure of the pump 29 from abnormally rising at the first and fourth ports 11 and 18 in the flow control valves 7 and 8.

Paths 51 and 52 are connected to respective portions of the paths 21 and 22 which are opened or closed by the normally-closed electromagnetic valves 25 and 26. When the electromagnetic valves 25 and 26 are closed, the third port (17) sides of the paths 21 and 22 are closed, while the reservoir (24) sides of the paths 21 and 22 are placed in communication with the paths 51 and 52, respectively. When the electromagnetic valves 25 and 26 are open, the paths 21 and 22 are communicated with the paths 51 and 52, respectively.

The paths 51 and 52 connect with the respective paths 12 and 13 and then join together into the path 53, which is connected to that portion of the path 4 which connects with both the master cylinder 2 and the path 35.

The paths 51 and 52 have check valves 55 provided at respective positions between the normally-closed electromagnetic valves 25 and 26 and the paths 12 and 13. The check valves 55 are each adapted to open when the brake fluid pressure in the portion of the path 51 (52) closer to the electromagnetic valve 25 (26) becomes a predetermined value higher than the brake fluid pressure in the portion of the path 51 (52) closer to the path 12 (13). Further, check valves 56 are provided at respective positions in the paths 51 and 52 which are closer to the path 53 than the paths 12 and 13. The check valves 56 are each adapted to open when the brake fluid pressure in the portion of the path 51 (52) closer to the path 12 (13) becomes a predetermined value higher than the brake fluid pressure in the portion of the path 51 (52) closer to the path 53.

The check valves 55 and 56 are provided for the purpose of effectively returning the brake fluid in the reservoir 24 to the master cylinder side and of immediately returning the brake fluid in the wheel cylinders 14 and 15 directly to the master cylinder side without passing it through the flow control valves 7 and 8 in such a case that the brake fluid pressure on the master cylinder side decreases as the brake pedal 3 is released with the brake fluid pressure remaining in the reservoir 24 during antiskid control.

It should be noted that the valve opening pressure for the check valves 55 and 56 is set so that these valves will not open on occasions other than those described above.

As has been described above, in this embodiment, the first and fourth ports 11 and 18 face each other in a coaxial relation and have the same diameter, and when the spool 38 is in the stationary state, the communication between the first and fourth ports 11 and 18 on the one hand and the upper bore 39 on the other hand is cut off, whereas, when the spool 38 is moved to reach the position as shown in FIG. 3, the first and fourth ports 11 and 18 are placed in communication with the upper bore 39, and the second port 16 and the upper bore 39 are also placed in communication with each other.

Further, in this embodiment, a check valve 58 is provided in the path 4 at a position between the junction where the path 4 connects with the path 35 and the junction where the path 4 connects with the path 53. The check valve 58 is connected at one side thereof with the master cylinder 2 and at the other side thereof with the first and fourth ports 11 and 18 and the discharge side of the pump 29.

The check valve 58 is adapted to open when the master cylinder-side brake fluid pressure acting on one side of the check valve 58 becomes a predetermined value higher than the pump discharge-side brake fluid pressure acting on the other side of the check valve 58, which is limited by the relief valve 49 according to need, thereby introducing the master cylinder-side brake fluid pressure to the first and fourth ports 11 and 18.

In addition, in this embodiment, a fifth port (master cylinder communicating port) 60 is axially formed in a portion of the casing 10 above the cylinder portion 9 in each of the flow control valves 7 and 8 such that the fifth port 60 is approximately coaxial with respect to the upper bore 39 of the spool 38 in the stationary state. The fifth port 60 of the flow control valve 7 is connected through a path 59 to the path 53 at a position between the check valve 56 in the path 51 and the junction where the path 53 connects with the path 52.

The fifth port 60 of the flow control valve 8 is connected to the path 53 through a path 61.

As shown in FIGS. 2 and 3, a valve chamber 62 is provided in the fifth port 60. The valve chamber 62 is provided therein with a spherical valve body 63 and a valve spring 64 for biasing the valve body 63 toward the upper bore 39.

The spool 38 has a projection 65 secured to the upper end portion of the upper bore 39 such that the projection 65 can extend as far as the inside of the valve chamber 62 toward the fifth port 60. Thus, the projection 65 can be inserted into the fifth port 60 with a clearance sufficiently large to allow the brake fluid to flow therethrough without encountering substantial resistance. The root of the projection 65 is formed with a predetermined number of bores 66 for placing the above-described clearance to the upper bore 39. The communicating bores 66 are sufficiently large to allow the brake fluid to flow therethrough without meeting substantial resistance.

When the spool 38 is held in a stationary state as shown in FIG. 2 by the biasing force of the spool spring 42, the projection 65 extends into the valve chamber 62 and presses the valve body 63 to move against the biasing force of the valve spring 64, thus causing the valve body 63 to leave a valve seat 67 provided at the end of the valve chamber 62 closer to the upper bore 39. Thus, the upper bore 39 is placed in communication with the path 59 (61) through the communicating bores 66.

When the spool 38 is moved against the biasing force of the spool spring 42, as shown in FIG. 3, the projection 65 withdraws from the valve chamber 62, thus canceling the pressure on the valve body 63. Consequently, the valve body 63 is caused to rest on the valve seat 67 by the biasing force of the valve spring 64 and the brake fluid pressure from the master cylinder 2, thereby completely cutting off the communication between the upper bore 39 and the path 59 (61).

The biasing force of the valve spring 64 is set smaller than that of the spool spring 42.

It should be noted that the valve body 63, the valve spring 64, the valve chamber 62 and the projection 65 constitute a cut-off valve 68. The position where the cut-off valve 68 is disposed is not necessarily limited to the inside of the fifth port 60 as in the above-described arrangement. The cut-off valve 68 may be provided anywhere between the master cylinder 2 and the fifth port 60.

The operation of the brake fluid pressure control apparatus 1 of this embodiment, which is arranged as described above, will be explained below.

It should be noted that since antiskid control is executed for each wheel, there may be cases where antiskid control is executed for the wheel cylinder of one wheel, while no antiskid control is executed for the wheel cylinder of another wheel. In the following description, however, the operation of the control apparatus 1 will be explained by way of an example in which the wheel cylinders of both wheels are subjected to antiskid control, for the sake of convenience.

In a case where an ordinary brake operation is carried out in a state where the antiskid control is inoperative, since the normally-closed electromagnetic valves 25 and 26 are in a non-excited state, the spool 38 in each of the flow control valves 7 and 8 is held in a stationary state by the biasing force of the spool spring 42. Accordingly, the cut-off valve 68, which is provided in the fifth port 60 of each of the flow control valves 7 and 8, is pressed by the projection 65 of the spool 38 and thus placed in an open state.

Therefore, in the flow control valve 7, the brake fluid pressure generated from the master cylinder 2 in accordance with the brake operation is introduced into the fifth port 60 through the path 59 and other paths; in the flow control valve 8, the brake fluid pressure is introduced into the fifth port 60 through the path 61 and other paths.

Then, the brake fluid pressure is transmitted to the wheel cylinder 14 (15) through the communicating bores 66, the upper bore 39 and second bore 44 of the spool 38, the upper port 19 of the second port 16, the path 12 (13), etc.

At this time, since the pump 29 is in an inoperative state, the master cylinder-side brake fluid pressure becomes a predetermined value higher than the brake fluid pressure on the discharge side of the pump 29, causing the check valve 58 to open. Thus, the brake fluid pressure is introduced to the first and fourth ports 11 and 18 of the two flow control valves 7 and 8 through the paths 4 to 6 and the paths 35 and 36. However, since the communication between the first and fourth ports 11 and 18 on the one hand and the second port 16 on the other is substantially cut off in each spool 38 which is in the stationary state, there is no possibility of the master cylinder-side brake fluid flowing toward the wheel cylinders 14 and 15 from the first and fourth ports 11 and 18.

At this time, the brake fluid pressure generated from the master cylinder 2 is introduced to the relief valve 49 through the path 48 and other paths. However, since the valve opening pressure of the relief valve 49 has been set so that the valve 49 cannot be opened by the master cylinder-side brake fluid pressure, there is no possibility of the brake fluid pressure being transmitted beyond the relief valve 49.

When an antiskid control unit (not shown) judges that the wheels are showing a wheel-lock tendency during the above-described brake operation on the basis of information from a wheel speed sensor (not shown) provided for each wheel and other necessary information, and decides to execute antiskid control, the normally-closed electromagnetic valves 25 and 26 are opened in response to a signal from the antiskid control unit. Consequently, the brake fluid residing at the lower bore (40) side of each of the flow control valves 7 and 8 flows into the reservoir 24 through the paths 21 to 23, thus causing a pressure difference to occur between the two ends of the small-diameter bore 41, that is, between the opposite ends of the spool 38. Consequently, the spool 38 moves downward and withdraws the projection 65 from the valve chamber 62.

The withdrawal of the projection 65 from the valve chamber 62 allows the valve body 63 to rest on the valve seat 67 by the action of the biasing force of the valve spring 64 and the master cylinder-side brake fluid pressure. Thus, the cut-off valve 68 is closed.

In addition, the spool 38 assumes a position where the lower port 20 and the third bore 45 are placed in communication with each other. Thus, the wheel cylinders 14 and 15 are each placed in communication with the reservoir 24 through the lower port 20, the third bore 45, the lower bore 40, the third port 17, etc., thereby allowing the brake fluid in the wheel cylinders 14 and 15 to flow into the reservoir 24, and thus reducing the brake fluid pressure. Further, the movement of the spool 38 causes the first port 11 and the first bore 43 to communicate with each other and also causes the fourth port 18 and the fourth bore 46 to communicate with each other.

During antiskid control, the pump 29 is constantly driven in response to a signal from the antiskid control unit, and when the brake fluid pressure is reduced as described above, the reservoir-side brake fluid that is sucked in and discharged from the pump 29 is adjusted to a predetermined level by the relief valve 49 and then introduced to the first port 11 of the flow control valve 7 through the paths 35, 4 and 5, and to the fourth port 18 of the flow control valve 7 through the paths 35, 4, 6 and 36, and further to the first port 11 of the flow control valve 8 through the paths 4 and 6, and further to the fourth port 18 of the flow control valve 8 through the paths 4 and 35.

Then, the brake fluid is introduced to the upper bore 39 of each spool 38 from the first and fourth ports 11 and 18 and circulates to the reservoir 24 through the small-diameter bore 41, the lower bore 40, the third port 17, etc. At this time, the flow rate of the brake fluid flowing into the upper bore 39 from the first and fourth ports 11 and 18 is adjusted by the action of the spool 38 which is vertically moved by a force resulting from a pressure difference induced between the two ends of the small-diameter bore 41 by the brake fluid when passing through it and the force of the spool spring 42. Thus, the pressure difference between the two ends of the small-diameter bore 41 is kept approximately constant, and the brake fluid flows to the reservoir 24 at an approximately constant flow rate.

In this embodiment, a pump discharge pressure higher than the master cylinder-side brake fluid pressure acts on the check valve 58 in the above-described state. However, the pump discharge pressure is checked by the valve 58 and thus prevented from influencing the master cylinder side.

Further, since the cut-off valve 68 is closed and the brake fluid pressure in the fifth port 60 is adjusted to a level higher than that in the lower bore 40 by an amount corresponding to a predetermined differential pressure by the vertical movement of the spool 38, the discharge pressure of the pump 29 has no influence on the master cylinder side.

When the lock tendency has been avoided and the operating conditions of the control apparatus 1 are to be changed from the above-described pressure-reducing state to a repressurizing state of the antiskid control, the normally-closed electromagnetic valves 25 and 26 are closed in response to a signal from the antiskid control unit. Since the spool 38 is in the movable state, the reservoir-side brake fluid that is sucked in and discharged from the pump 29 flows through the passage defined by the first port 11 and the first bore 43 and the passage defined by the fourth port 18 and the fourth port 46 and then flows through the upper bore 39, the small-diameter bore 41, the lower bore 40, the third bore 45 and the lower port 20 to each of the wheel cylinders 14 and 15 to repressurize them in a state where the brake fluid is completely prevented from returning to the master cylinder side by the checking action of the check valve 58 and the action of the cut-off valve 68, which is closed, in the same way as in the case of the above-described pressure-reducing process.

At this time, the flow rate of the brake fluid flowing into the upper bore 39 from the first and fourth ports 11 and 18 is adjusted by the action of the spool 38 which is vertically moved by a force resulting from a pressure difference induced between the two ends of the small-diameter bore 41 by the brake fluid when passing through it and the force of the spool spring 42.

Thus, the pressure difference between the two ends of the small-diameter bore 41 is kept approximately constant, and the brake fluid flows at an approximately constant flow rate to repressurize the wheel cylinders 14 and 15.

In addition, in this embodiment, when the brake fluid in the reservoir 24, which is sucked in and discharged from the pump 29, is running short during the above-described repressurizing process because of a rapid change from a state where the antiskid control has been executed under the conditions where the coefficient of friction of the road surface is low to a state where the control is executed under high friction coefficient conditions, the discharge pressure of the pump 29 becomes a predetermined value lower than the master cylinder-side brake fluid pressure. Consequently, the check valve 58 opens to allow the master cylinder-side brake fluid pressure to be introduced to the first and fourth ports 11 and 18.

Thus, the pressure difference between the two ends of each spool 38 gradually decreases, and the spool 38 is gradually shifted to a stationary state by the biasing force of the spool spring 42, causing the cut-off valve 68 to open. Consequently, the upper bore 39 and the path 59 (61) are placed in communication with each other, and the second bore 44 and the upper port 19 are placed in communication with each other. Until this state is reached, the brake fluid pressure from the master cylinder 2 is introduced into the upper bore 39 from the first port 11 through the first bore 43 communicating with it and from the fourth port 18 through the fourth bore 46 communicating with it. Thus, only a necessary brake fluid pressure is transmitted to each of the wheel cylinders 14 and 15 through the small-diameter bore 41, the lower bore 40, the lower port 20, etc.

As has been described above, according to the brake fluid pressure control apparatus 1 of this embodiment, when the spool 38 is held in a stationary state by the biasing force of the spool spring 42 when the antiskid control is inoperative, the cut-off valve 68, which is provided in the fifth port 60, is open. Accordingly, the brake fluid pressure generated from the master cylinder 2 is transmitted to each of the wheel cylinders 14 and 15 from the fifth port 60 through the second port 16.

When the spool 38 is moved against the biasing force of the spool spring 42 by a pressure difference produced between the two ends of the spool 38 during pressure-reducing process and repressurizing process of the antiskid control, the cut-off valve 68 in the fifth port 60, which is provided outside the range in which the spool 39 slides relative to the casing 10, is closed in response to the movement of the spool 38. Further, by virtue of the checking action of the check valve 58, despite the presence of a clearance for sliding movement between the spool 38 and the casing 10 of each of the flow control valves 7 and 8, the discharge pressure of the pump 29 can be completely prevented from influencing the master cylinder 2. Thus, propagation of uncomfortable vibration to the driver can be prevented.

Further, since the cut-off valve 68 operates in response to the movement of the spool 38, the structure is simplified, and the cost can be reduced compared with an arrangement employing an electromagnetic valve or the like.

In addition, when the brake fluid in the reservoir 24, which is sucked in and discharged from the pump 29, is running short because of a rapid change from a running condition where the coefficient of friction of the road surface is low to a running condition where the road surface friction coefficient is high, the master cylinder-side brake fluid pressure becomes a predetermined value higher than the pump discharge-side brake fluid pressure, causing the check valve 58 to open before the spool 38 returns to the stationary state. Thus, the master cylinder-side brake fluid pressure is transmitted to each of the wheel cylinders 14 and 15 from the first and fourth ports 11 and 18 through the spool 38 which is in a movable state and through the second port 16. Accordingly, the wheel cylinders 14 and 15 are immediately pressurized.

Moreover, since the master cylinder-side brake fluid is introduced to the first and fourth ports 11 and 18 in the same way as the discharge of the pump 29, it is possible to prevent a change in the flow rate of the brake fluid flowing toward the wheel cylinders 14 and 15.

Further, in the above-described embodiment, the fifth port 60 is disposed in the center of a portion of the casing 10 above the spool 38 so that the master cylinder-side brake fluid pressure is introduced into the upper bore 39 from the fifth port 60. Therefore, the brake fluid pressure will not act on the spool 38 in a direction perpendicular to the sliding direction thereof. It should be noted that the fifth port 60 may be acceptable as long as at least a portion thereof which opens to the cylinder portion 9 extends along the axis of the cylinder portion 9.

In addition, the first and fourth ports 11 and 18 having the same diameter are coaxially disposed to face each other perpendicularly to the travel direction of the spool 38. Although the brake fluid pressure generated from the master cylinder 2 during the ordinary brake operation, or the discharge pressure of the pump 29, or the brake fluid pressure supplied from the master cylinder 2 when the reservoir fluid is running short, is introduced from the first and fourth ports 11 and 18, approximately equal fluid pressures act on the spool 38 from both sides thereof, and hence these fluid pressures cancel each other. It should be noted that the first and fourth ports 11 and 18 may be acceptable as long as at least portions thereof which open to the cylinder portion 9 are disposed to face each other as described above.

Thus, there is no possibility of the spool 38 being pressed against the wall of the casing 10 from one side and becoming unable to slide smoothly as in the case where the brake fluid pressure acts on the spool 38 onesidedly in a direction perpendicular to the sliding direction of the spool 38. Accordingly, the spool 38 can always smoothly slide in the casing 19, and hence it is possible to stabilize the pressurizing speed for the wheel cylinders 14 and 15 when they are repressurized during the antiskid control. In addition, it is possible to improve the response of the antiskid control. It should be noted that the first and fourth ports 11 and 18 need not always be coaxial and equal in diameter to each other, and that the spool 38 can slide smoothly, provided that the first and fourth ports 11 and 18 are disposed to face each other approximately perpendicularly to the travel direction of the spool 38.

Although in the foregoing embodiment the present invention has been described by way of an example in which the pump 29 is driven even during the pressure-reducing process of the antiskid control to improve the response of the repressurizing process, it should be noted that the present invention may also be applied to an arrangement in which the pump 29 is driven only during the repressurizing process, as a matter of course.

As has been detailed above, according to the brake fluid pressure control apparatus of the present invention, when the spool is held in a stationary state by the biasing force of the spool spring when the antiskid control is inoperative, the cut-off valve is open to transmit the brake fluid pressure generated from the master cylinder to the wheel cylinder from the master cylinder communicating port through the wheel cylinder communicating port. The cut-off valve is closed when the spool is moved and brought into a movable state against the biasing force of the spool spring by a pressure difference produced between the two ends of the spool at least during repressurizing process of the antiskid control. Moreover, the cut-off valve is provided between the master cylinder and the master cylinder communicating port. Further, the check valve remains closed because the master cylinder-side brake fluid pressure will not become a predetermined value higher than the pump discharge-side brake fluid pressure. Therefore, despite the presence of a clearance in the flow control valve, the pump discharge pressure can be completely prevented from influencing the master cylinder. Thus, propagation of uncomfortable vibration to the driver can be prevented.

When the brake fluid in the reservoir, which is sucked in and discharged from the pump, is running short because of a rapid change from a state where the antiskid control has been executed under the conditions where the coefficient of friction of the road surface is low to a state where the control is executed under high friction coefficient conditions, and hence the pump discharge pressure lowers, the master cylinder-side brake fluid pressure becomes a predetermined value higher than the pump discharge-side brake fluid pressure, causing the check valve to open before the spool returns to the stationary state. Thus, the master cylinder-side brake fluid pressure is transmitted to the wheel cylinder communicating port from the first and second pump communicating ports through the spool which is in a movable state. Accordingly, the wheel cylinder is immediately pressurized.

Moreover, since the master cylinder communicating port is provided to extend along the travel direction of the spool, the brake fluid pressure introduced from the master cylinder communicating port will not act on the spool in a direction perpendicular to the sliding direction thereof. Further, the first and second pump communicating ports are disposed to face each other approximately perpendicularly to the travel direction of the spool, and the check valve, when it is open, allows the brake fluid pressure from the master cylinder to be introduced to the first and second pump communicating ports, or the pump also introduces the discharge pressure to the first and second pump communicating ports. Accordingly, the brake fluid pressures that act on the spool from opposite directions, which are perpendicular to the travel direction of the spool, cancel each other. Therefore, there is no possibility of the brake fluid pressure acting on the spool onesidedly in a direction perpendicular to the sliding direction thereof. Accordingly, the spool can always smoothly slide in the casing, and it is possible to improve the response of the antiskid control.

What is claimed is:

1. A brake fluid pressure control apparatus comprising:

a flow control valve which has a casing, a spool and a spool spring biasing said spool, said casing having a master cylinder communicating port extending in a direction of movement of said spool and communicating with a master cylinder, a port communicating with a wheel cylinder, a port communicating with a variable-capacity reservoir through a normally-closed valve, and a first pump communicating port communicating with a discharge side of a pump that sucks the reservoir-side brake fluid and discharges it, said spool being slidable in said casing and defining passageways configured so that, when the spool is held in a stationary state by a biasing force of the spool spring when antiskid control is inoperative, said spool provides communication between said master cylinder communicating port and said wheel cylinder communicating port, and so that when said spool is moved and brought into a movable state against the biasing force of said spool spring by a pressure difference produced between two ends of said spool at least during a repressurizing process of antiskid control, said spool provides communication between said first pump communicating port and said wheel cylinder communicating port, and wherein said casing also has a second pump communicating port that communicates with the discharge side of said pump, and that also communicates with said wheel cylinder communicating port when said spool is in said movable state, said second pump communicating port facing towards said first pump communicating port and being disposed approximately perpendicularly to the direction of movement of said spool, said first and second pump communicating ports being connected to said master cylinder;

a check valve provided between each of said first and second pump communicating ports and said master cylinder, said check valve being adapted to open when the master cylinder-side brake fluid pressure becomes a predetermined value higher than the pump discharge-side brake fluid pressure; and a cut-off valve provided between said master cylinder communicating port and said master cylinder, said cut-off valve being closed when said spool is brought into said movable state.

2. A brake fluid pressure control apparatus according to claim 1, wherein said first and second pump communicating ports are substantially coaxial.

3. A brake fluid pressure control apparatus according to claim 1, wherein said first and second pump communicating ports have substantially the same diameter.

4. A brake fluid pressure control apparatus according to claim 1, wherein said cut-off valve comprises a valve chamber provided in communication with said master cylinder communicating port, a valve body movably contained in said valve chamber, a valve seat formed in said valve chamber and a valve spring biasing said valve body toward said valve seat so as to close said master cylinder communicating port, said spool being provided with a projection at one end thereof so that the projection moves said valve body against said valve spring to open said master cylinder communicating port when said spool is in said stationary state.

* * * * *